United States Patent
Sikorski (10) Patent No.: US 12,246,599 B2
(45) Date of Patent: Mar. 11, 2025

(54) HYDRAULIC REGENERATIVE BRAKING SYSTEM

(71) Applicant: HIT THE BRAKES, LLC, Avon, OH (US)

(72) Inventor: Robert James Sikorski, New Franklin, OH (US)

(73) Assignee: HIT THE BRAKES, LLC, Avon, OH (US)

( * ) Notice: Subject to any disclaimer, the term of this patent is extended or adjusted under 35 U.S.C. 154(b) by 316 days.

(21) Appl. No.: 17/930,902

(22) Filed: Sep. 9, 2022

(65) Prior Publication Data
US 2024/0083237 A1    Mar. 14, 2024

(51) Int. Cl.
| | |
|---|---|
| B60K 6/12 | (2006.01) |
| B60R 16/03 | (2006.01) |
| B60T 1/10 | (2006.01) |
| B60T 13/58 | (2006.01) |
| F15B 1/04 | (2006.01) |
| F15B 1/26 | (2006.01) |

(52) U.S. Cl.
CPC ............ *B60K 6/12* (2013.01); *B60R 16/0307* (2013.01); *B60T 1/10* (2013.01); *B60T 13/585* (2013.01); *F15B 1/04* (2013.01); *F15B 1/26* (2013.01)

(58) Field of Classification Search
CPC .. B60K 6/12; B60K 6/445; B60K 2006/4816; B60K 2006/4833; B60K 6/48; B60K 6/485; B60R 16/0307; B60T 1/10; B60T 13/585; F15B 1/04; F15B 1/26; B60W 2720/125; B60W 30/18127

See application file for complete search history.

(56) References Cited

U.S. PATENT DOCUMENTS

| | | | |
|---|---|---|---|
| 5,486,018 A | 1/1996 | Sakai | |
| 7,425,183 B2 * | 9/2008 | Kelley, Jr. | ............... B60T 1/093 475/213 |

(Continued)

FOREIGN PATENT DOCUMENTS

| | | |
|---|---|---|
| DE | 102009001357 A1 | 9/2010 |
| EP | 2196338 | 10/2011 |

(Continued)

*Primary Examiner* — James A Shriver, II
*Assistant Examiner* — Ian Bryce Shelton
(74) *Attorney, Agent, or Firm* — Renner, Otto, Boisselle & Sklar, LLP (57) ABSTRACT

A hydraulic regenerative braking system is provided for using hydraulic fluid to capture energy from a vehicle during a braking event. The system captures kinetic energy from a shaft of the vehicle and stores the kinetic energy as hydraulic potential energy. That is, the system captures rotational energy as hydraulic potential energy in an accumulator. The hydraulic regenerative braking system also discharges the hydraulic potential energy as kinetic energy. During braking, kinetic energy is transferred from the vehicle shaft to a gearbox, and from the gearbox to a hydraulic pump. The hydraulic pump uses the kinetic energy to pump hydraulic fluid to an accumulator, increasing the hydraulic potential energy stored in the accumulator. During driving, the hydraulic fluid is released from the accumulator to the hydraulic pump, generating kinetic energy that is transferred to the vehicle shaft via the gearbox.

14 Claims, 4 Drawing Sheets

(56) References Cited

U.S. PATENT DOCUMENTS

| | | | | |
|---|---|---|---|---|
| 7,669,414 | B2* | 3/2010 | Loeffler | B60K 25/00 60/419 |
| 8,038,230 | B2 | 10/2011 | Nakamura | |
| 8,327,637 | B2* | 12/2012 | Loeffler | B60K 6/12 60/419 |
| 8,840,524 | B2* | 9/2014 | Arsenault | B60W 10/11 477/5 |
| 9,132,824 | B2* | 9/2015 | Arsenault | B60W 10/10 |
| 9,352,743 | B2* | 5/2016 | Davis | B60K 6/12 |
| 9,738,162 | B2* | 8/2017 | Ferri | B60W 10/06 |
| 10,422,361 | B2* | 9/2019 | Guo | B60T 13/14 |
| 12,055,166 | B2* | 8/2024 | Jagoda | F15B 11/165 |
| 2006/0000208 | A1* | 1/2006 | Teslak | B60T 1/10 60/414 |
| 2006/0079375 | A1* | 4/2006 | Marshall | B60K 6/12 477/115 |
| 2007/0087888 | A1* | 4/2007 | Kelley | B60W 10/02 475/198 |
| 2007/0227801 | A1* | 10/2007 | Loeffler | B60K 25/00 180/305 |
| 2010/0107624 | A1* | 5/2010 | Loeffler | B60K 25/00 417/364 |
| 2013/0042602 | A1 | 2/2013 | Gauthier | |
| 2013/0178328 | A1* | 7/2013 | Arsenault | B60W 10/24 477/3 |
| 2014/0124281 | A1* | 5/2014 | Moore | G06F 11/30 180/165 |
| 2014/0274522 | A1* | 9/2014 | Davis | E02F 9/2217 475/2 |
| 2014/0350807 | A1* | 11/2014 | Arsenault | B60W 10/11 701/54 |
| 2016/0047397 | A1* | 2/2016 | Sikorski | F15B 1/04 60/416 |
| 2016/0221448 | A1* | 8/2016 | Pritchard | B60K 6/12 |
| 2016/0272068 | A1* | 9/2016 | Ferri | B60L 7/26 |
| 2018/0163753 | A1* | 6/2018 | Guo | B60L 7/24 |
| 2020/0238812 | A1* | 7/2020 | O'Brien | B60K 6/12 |

FOREIGN PATENT DOCUMENTS

| | | | | |
|---|---|---|---|---|
| EP | 2471679 | A2 * | 7/2012 | B60K 6/12 |
| EP | 3339071 | A1 | 6/2018 | |
| NZ | 500627 | A * | 1/2001 | B60K 6/105 |
| WO | 1998047732 | A1 | 10/1998 | |
| WO | WO-9847732 | A1 * | 10/1998 | B60K 6/105 |
| WO | 2011045519 | A1 | 4/2011 | |
| WO | 2014165361 | A1 | 10/2014 | |

* cited by examiner

HYDRAULIC REGENERATIVE BRAKING SYSTEM

TECHNICAL FIELD

The present disclosure relates generally to regenerative braking and more particular to hydraulic regenerative braking.

BACKGROUND

Hybrid systems generally relate to the inclusion of two technologies to increase the overall efficiency of a system. An example hybrid system is a gasoline/electric hybrid vehicle. In the gasoline/electric hybrid vehicle an electrical motor operates in tandem with a fossil fuel engine. The electrical motor and the fossil fuel engine cooperate to generate energy to move the hybrid vehicle. Hydraulic hybrid systems incorporate a hydraulic system with another technology (usually a fossil fuel engine or a motor) to increase efficiency. For example, a fossil fuel engine may store potential energy in a hydraulic accumulator. The potential energy may be recouped later by discharging the hydraulic accumulator to provide kinetic energy to the system.

SUMMARY

The present disclosure provides a hydraulic regenerative braking system for capturing kinetic energy as hydraulic potential energy during vehicle braking using a gearbox, a hydraulic pump, and an accumulator. During driving (e.g., acceleration), the hydraulic potential energy stored in the hydraulic accumulator is converted to kinetic energy using the hydraulic pump to provide torque to a shaft of the vehicle via the gearbox.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the many ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a hydraulic regenerative braking system for using hydraulic fluid to capture energy from a vehicle during braking (also referred to as a braking event). The hydraulic regenerative braking system is configured to capture kinetic energy from a shaft (e.g., the drive shaft) of the vehicle and to store the kinetic energy as hydraulic potential energy in the accumulator. During braking, torque is transferred from the vehicle shaft to a gearbox, and from the gearbox to a hydraulic pump. The hydraulic pump uses the transferred torque to pump hydraulic fluid to an accumulator, increasing the hydraulic potential energy of the accumulator. That is, the hydraulic regenerative braking system uses captured kinetic energy (also referred to as rotational energy or torque) to increase the hydraulic potential energy of the accumulator. The hydraulic regenerative braking system also discharges the hydraulic potential energy to the vehicle shaft as auxiliary or supplementary rotational energy. That is, the hydraulic fluid is released from the accumulator to the hydraulic pump, generating torque that is transferred to the vehicle shaft via the gearbox.

Figure 1:
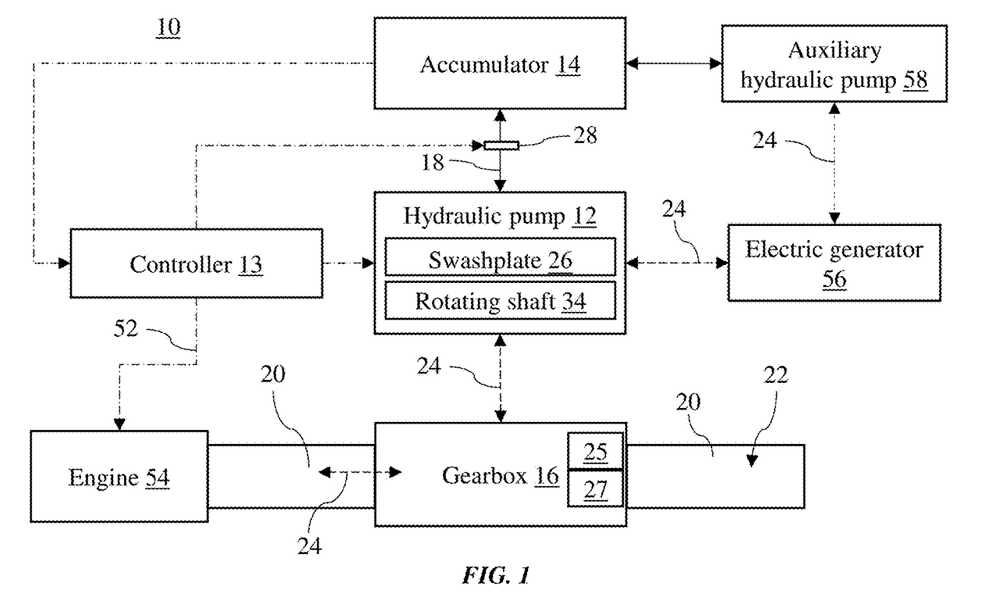
FIG. 1 illustrates a block diagram of an exemplary hydraulic regenerative braking system.

In the exemplary embodiment of FIG. 1, a hydraulic regenerative braking system 10 is shown including a hydraulic pump 12, a controller 13, an accumulator 14, and a gearbox 16. The hydraulic pump 12 (also referred to as a hydraulic motor) has a capture mode and a drive mode. The hydraulic pump 12 is configured to act as a pump in the capture mode and as a motor in the drive mode. The controller 13 includes processor circuitry 17 configured to cause the hydraulic pump 12 to transition between the capture mode and the drive mode.

The accumulator 14 receives and stores hydraulic fluid 18 (also referred to as working fluid) from the hydraulic pump 12. In the capture mode and during the braking event, a hydraulic potential energy is increased in the accumulator 14. In the drive mode (e.g., during acceleration), the accumulator 14 releases the stored hydraulic fluid 18 to the hydraulic pump 12, such that the hydraulic potential energy is decreased in the accumulator 14 (e.g., due to the hydraulic pump 12 generating kinetic energy from the received hydraulic potential energy). The gearbox 16 is mechanically linked to a shaft 20 of a vehicle 22. In the drive mode, torque 24 is transferred from the gearbox 16 to the shaft 20 of the vehicle 22. In the capture mode, torque 24 is transferred to the gearbox 16 from the shaft 20 of the vehicle 22.

Figure 2:
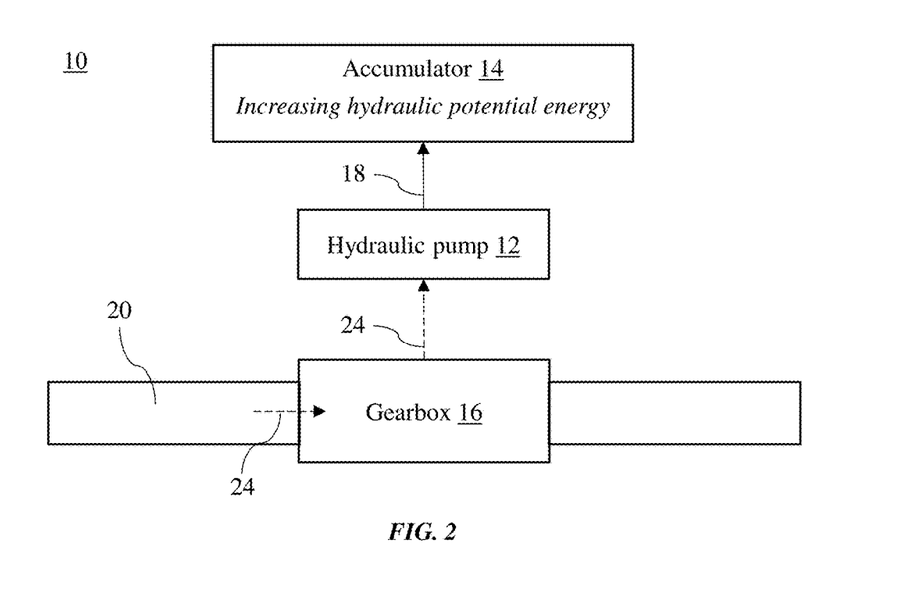
FIG. 2 illustrates transfer of hydraulic potential energy and torque by the hydraulic regenerative braking system of FIG. 1 in a capture mode.
Figure 3:
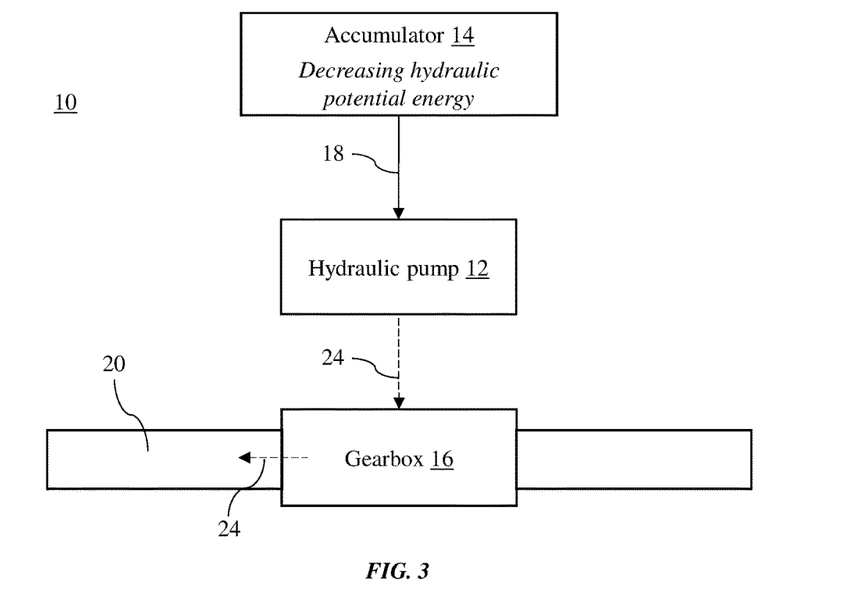
FIG. 3 illustrates transfer of hydraulic potential energy and torque by the hydraulic regenerative braking system of FIG. 1 in a drive mode.

The hydraulic pump 12 is hydraulically connected to the accumulator 14 and is mechanically connected to the gearbox 16, such that the hydraulic pump 12 pumps hydraulic fluid 18 to the accumulator in the capture mode and the hydraulic pump supplies torque 24 to the gearbox 16 in the drive mode. That is, as shown in FIG. 2, in the capture mode torque 24 (also referred to as kinetic energy or rotational energy) received by the hydraulic pump 12 from the gearbox 16 results in the hydraulic pump 12 pumping the hydraulic fluid 18 to the accumulator 14 (increasing the hydraulic potential energy of the accumulator 14). Conversely, as shown in FIG. 3, in the drive mode the hydraulic fluid 18 received by the hydraulic pump 12 from the accumulator 14 results in the hydraulic pump 12 supplying torque 24 to the gearbox 16.

In the capture mode (as shown in FIG. 2), the torque 24 is transferred to the gearbox 16 from the shaft 20 of the vehicle 22, such that the torque 24 received by the gearbox 16 is transferred to the hydraulic pump 12, causing the hydraulic pump 12 to pump the hydraulic fluid 18 to the accumulator 14, increasing the hydraulic potential energy of the accumulator 14. In the drive mode (as shown in FIG. 3), the hydraulic potential energy of the accumulator 14 moves the stored hydraulic fluid 18 from the accumulator 14 to the hydraulic pump 12, such that the hydraulic pump 12 generates and supplies torque 24 to the gearbox 16. The gearbox 16 transfers the received torque 24 to the shaft 20 of the vehicle 22. The torque 24 transferred to the shaft 20 may be used to accelerate the vehicle 22.

As described above, the hydraulic pump 12 act as a pump in the capture mode and as a motor in the drive mode. The change between acting as a pump and a motor may be determined based on a positioning of a swashplate 26 (also referred to as a slant disk) of the hydraulic pump 12. That is, the hydraulic pump may include a swashplate 26 and the positioning of the swashplate 26 may control whether the hydraulic pump operates in the capture mode or the drive mode by controlling a flow direction of the hydraulic fluid 18 relative to the hydraulic pump 12. For example, an angle of the swashplate 26 may determine whether the hydraulic fluid 18 is pumped towards the accumulator 14 by the hydraulic pump 12 or whether the hydraulic fluid 18 is received by the hydraulic pump 12 from the accumulator 14. The positioning of the swashplate 26 may be controlled by the controller 13 (e.g., using an actuator configured to adjust the position of the swashplate 26).

In one embodiment, the swashplate 26 includes a separate hydraulic circuit for controlling the position of the swashplate 26. For example, the separate hydraulic circuit may include a filter and accumulator for controlling a hydraulic pressure supplied to the swashplate 18.

The accumulator 14 may be any device suitable for receiving and storing hydraulic potential energy. For example, the accumulator 14 (also referred to as a hydraulic accumulator) may be a pressure storage reservoir in which an incompressible hydraulic fluid is held under pressure (e.g., the pressure being applied by the hydraulic pump 12).

While the hydraulic pump 12 and the gearbox 16 are shown as being directly connected in FIG. 1, there may be additional linkages (i.e., components) between the hydraulic pump 12 and the gearbox 16 (e.g., a transmission or clutch). Similarly, the hydraulic pump 12 may be directly connected to the accumulator 14 or there may additional components between the hydraulic pump 12 and the accumulator 14.

In one embodiment, the gearbox 16 may be disengageable from the shaft 18. For example, the gearbox 16 may be disengaged from the shaft 18, such that the vehicle 20 may continue to function if there is an issue with the system 10. The gearbox 16 may be controllably engaged and disengaged from the system via an actuator 25 moving a repositionable gear 27. For example, the shaft 18 may include a gear located inside the gearbox 16. The gearbox 16 may include the repositionable gear 27 configured to engage with the gear of the shaft 18. The actuator 25 may be controllable by the controller 13 to adjust a position of the repositionable gear 27, such that the system 10 is either engaged with the shaft 18 or disengaged from the shaft 18. When the gearbox 16 is engaged with the shaft 18, torque may be transferred between the gearbox 16 and the shaft 18. When the gearbox 16 is disengaged with the shaft 18, torque may not be transferred between the gearbox 16 and the shaft 18 (e.g., due to a lack of mechanical linkage between the gearbox 16 and the shaft 18).

In one embodiment, the system 10 additionally includes a variable orifice valve 28 for regulating flow of the hydraulic fluid 18 from the hydraulic pump 12 to the accumulator 14. The controller 13 may control the variable orifice valve 28, such that a resistance to flow of the hydraulic fluid 18 from the hydraulic pump 12 is maintained during the braking event. For example, the controller 13 may control the variable orifice valve 28, such that a resistance to rotation of the shaft 18 of the vehicle 20 is uniform during the braking event.

In the capture mode, both the hydraulic potential energy of the accumulator 14 and the variable orifice valve 28 may affect the resistance to flow of the hydraulic fluid 18 from the hydraulic pump 12 to the accumulator 14. The controller 13 may control the variable orifice valve 28 based on an internal pressure of the accumulator 14. That is, the internal pressure of the accumulator 14 may be used as a measure of the hydraulic potential energy of the accumulator 14. For example, the controller 13 may include a pressure sensor or may receive a measurement of pressure from a sensor external to the controller 13.

The variable orifice valve 28 (e.g., also referred to as a proportional valve) may be any suitable valve for regulating flow of the hydraulic fluid 18. For example, an opening (also referred to as an aperture) of the variable orifice valve 28 may be variable and controllable by the controller 13.

The controller 13 may be any suitable device for controlling components of the system 10 (e.g., the variable orifice valve 28). For example, the controller 13 may be an electronic controller configured to operate through communication of electrical signals generated at the components and/or sensors monitoring operation of the components. In these and other embodiments, the controller 13 may interface with an engine of the vehicle via a controller area network (CAN) bus, which may enable communication of electrical signals from the components electrically coupled to the CAN bus. Additionally, the controller 13 may receive other signals via other communication interfaces, without limitation.

The controller 13 may include processor circuitry such as a processor (e.g., CPU), programmable circuit, integrated circuit, memory and I/O circuits, an application specific integrated circuit, microcontroller, complex programmable logic device, other programmable circuits, or the like. The controller 13 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the circuitry. The circuitry may be communicatively coupled to the computer readable medium and network interface through a system bus, mother board, or using any other suitable structure known in the art.

The hydraulic pump 12 may be any suitable hydraulic device for generating kinetic (e.g., rotational) energy from hydraulic potential energy and for generating hydraulic potential energy from kinetic energy. For example, the hydraulic pump 12 may include a variable-displacement motor, a constant displacement motor, a gear hydraulic pump, a gerotor pump, a vane pump, a piston pump, or any other suitable pump. A variable-displacement motor may vary the amount of hydraulic fluid that is moved in one cycle of the hydraulic pump 12. The amount of hydraulic fluid can be controlled remotely or directly. Additionally or alternatively, the amount of the hydraulic fluid can be controlled using a fluid, an electrical signal, or a mechanical actuator. By varying the amount of hydraulic fluid in one cycle of the hydraulic pump 12, a torque applied to the shaft 20 during discharge of the accumulator 14 may be controlled. Thus, in these and other embodiments, a torque applied to the shaft 20 by discharge of the hydraulic potential energy may be controlled at least partially by the hydraulic pump 12.

The hydraulic pump 12 may be any suitable hydraulic pump or hydraulic motor (e.g., a hydrostat) capable of pumping hydraulic fluid 18 to the accumulator 14 and supplying torque 24 to the gearbox 16. In one embodiment, the hydraulic pump 12 includes a rotating shaft 34. The hydraulic fluid 18 received by the hydraulic pump 12 from the accumulator 14 may cause the rotating shaft 34 to rotate. The rotating shaft 34 may be rotationally connected to the gear box 16, such that rotation of the rotating shaft 34 causes rotation of the shaft 20 of the vehicle 22.

In addition to the accumulator, the hydraulic pump 12 may be hydraulically coupled to a valve assembly and/or a reservoir. For example, when the shaft is transferring energy to the hydraulic pump 12, the valve assembly and/or the reservoir may be configured such that the hydraulic pump 12 is driving hydraulic fluid from the reservoir to the accumulator 14. The hydraulic fluid builds pressure in the accumulator 14 and accordingly builds hydraulic potential energy. While the accumulator 14 is discharging hydraulic potential energy to the hydraulic pump 12, the valve assembly may be configured such that the hydraulic fluid (or another working fluid) is ported from the accumulator 14 to the hydraulic pump 12, which may cause rotation of the hydraulic pump 12 as described above.

Figure 4:
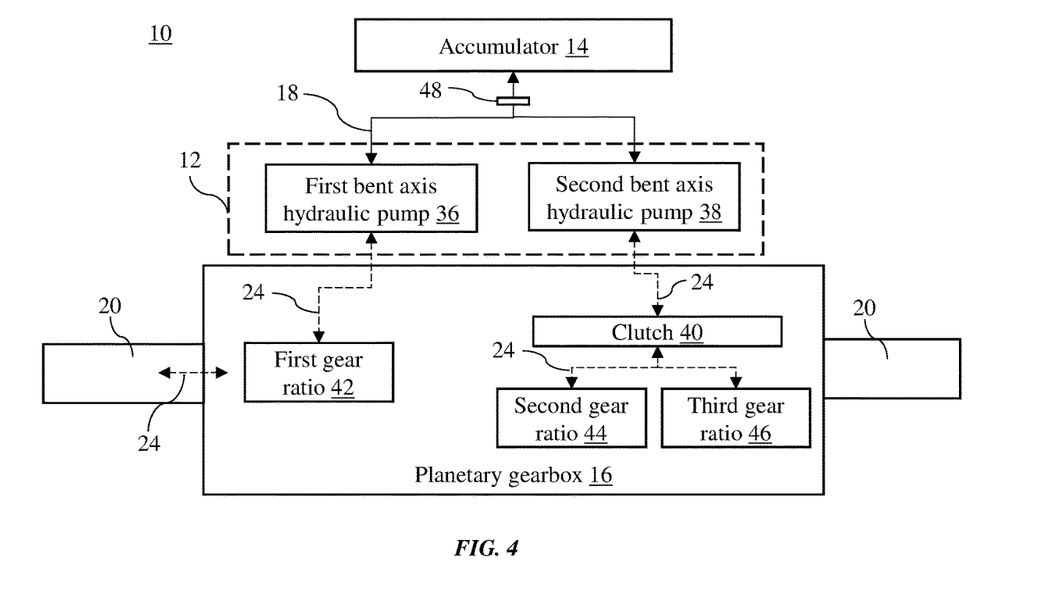
FIG. 4 illustrates a block diagram of an exemplary hydraulic regenerative braking system having a first and second bent axis hydraulic pump and a planetary gearbox.

In the embodiment shown in FIG. 4, the hydraulic pump 12 may include a first bent axis hydraulic pump 36 and a second bent axis hydraulic pump 38. The gearbox 16 may be a planetary gearbox having a clutch 40, a first gear ratio 42, a second gear ratio 44, and a third gear ratio 46. The first bent axis hydraulic pump 36 may be rotationally connected to the first gear ratio 42, and the second bent axis hydraulic pump 38 may be rotationally connected to both the second gear ratio 44 and the third gear ratio 46 by the clutch 40.

With continued reference to the embodiment shown in FIG. 4, the system 10 also includes a control valve 48 for controlling whether the hydraulic pump 12 acts as a pump or a motor. That is, the control valve 48 is configured to control a direction of flow of the hydraulic fluid 18, such that the hydraulic fluid 18 either flows to the accumulator 14 from the first bent axis hydraulic pump 36 and the second bent axis hydraulic pump 38, or from the accumulator 14 to the first bent axis hydraulic pump 36 and the second bent axis hydraulic pump 38. For example, the control valve 28 may be a valve manifold configured to change routing of hydraulic fluid 18 to the reservoir or to the accumulator 14.

The control valve 48 may be any suitable valve for controlling a direction of flow of the hydraulic fluid 18. The control valve 48 may be controlled by the controller 13 or any suitable control device.

The processor circuitry 17 of the controller 13 may also be configured to control energy (e.g., gasoline) supplied to an engine 54 of the vehicle 22 based on rotational energy supplied to the shaft 20 of the vehicle 22. For example, as the torque 24 being supplied to the shaft 20 from the hydraulic regenerative braking system 10 decreases, the controller 13 may increase the amount of gasoline supplied to the engine 54 (increasing the rotational energy supplied to the drive shaft by the engine 54).

In one embodiment, the controller 13 may be configured to output an acceleration signal 52 to an engine 54 of the vehicle 22 based on the hydraulic potential energy of the accumulator 14, such that a decrease in the hydraulic potential energy of the accumulator 14 results in an increase in the acceleration signal 52. For example, as the internal pressure of the accumulator 14 decreases or as the torque 24 supplied to the gearbox 16 decreases, the acceleration signal 52 supplied to the engine 54 of the vehicle 22 may be increased such that the engine 54 begins supplying more energy to the shaft 20.

In one embodiment, the controller 13 dynamically remaps fuel flow in the engine based on the hydraulic potential energy of the accumulator 14. For example, the controller 13 may adjust an amount of fuel provided to the engine based on the requested acceleration (e.g., how far down the accelerator is depressed), a current speed of the vehicle, and the hydraulic potential energy of the accumulator. The controller 13 may receive as an input a position of the accelerator and determine a requested acceleration (e.g., using a lookup table). The controller 13 may then determine the fuel required to accomplish the requested acceleration based on current vehicle speed and the hydraulic potential energy of the accumulator. The controller 13 may then provide fuel to the engine based on the determined fuel requirement. For example, the controller 13 may provide the determined fuel amount, 10% less than the determined fuel, 5% less than the determined fuel, 5% more than the determined fuel, or 10% more than the determined fuel.

The system 10 may include an electric generator 56 mechanically connected to the hydraulic pump 12. The electric generator 56 is configured to generate electricity from kinetic energy (e.g., torque 24) supplied by the hydraulic pump 12. For example, when in drive mode (e.g., while not capturing brake energy), the hydraulic pump 12 may supply torque 24 to the electric generator 56 so that the electric generator 56 generates electricity. This generated electricity may be used to charge a battery.

In one embodiment, the system 10 also includes an auxiliary hydraulic pump 58 in addition to the electric generator 56. The auxiliary hydraulic pump 58 may be mechanically coupled to the electric generator 56, and hydraulically coupled to the accumulator 14. That is, the auxiliary hydraulic pump 58 may receive hydraulic fluid 18 from the accumulator 14 and generate torque 24 from the received hydraulic fluid 18. The generated torque 24 may be supplied to the electric generator 56. As an example, the electric generator 56 may generate a trickle charge that the battery is capable of receiving and storing without generating significant waste heat. That is, the battery may have a maximum electrical power that can be stored per second and the electric generator 56 may be supplied hydraulic fluid 24 by the hydraulic pump 12 at a rate, such that the electric generator 56 generates electricity that is less than or equal to the maximum electrical power that the battery can store per second.

In one embodiment, the accumulator 14 has a variable-volume. For example, when the hydraulic potential energy received by the accumulator 14 is low (also referred to as a low kinetic output), a storage volume of the accumulator 14 may be decreased resulting in adequate predetermined system pressure for when the vehicle is stopped. The storage volume may be adjusted through control of a fluid into a control volume of the accumulator. The control of the fluid may be volumetrically dependent on the kinetic output of the machine. As the kinetic output of the machine increases, the storage volume of the accumulator increases to capture an increased kinetic energy.

Figure 5:
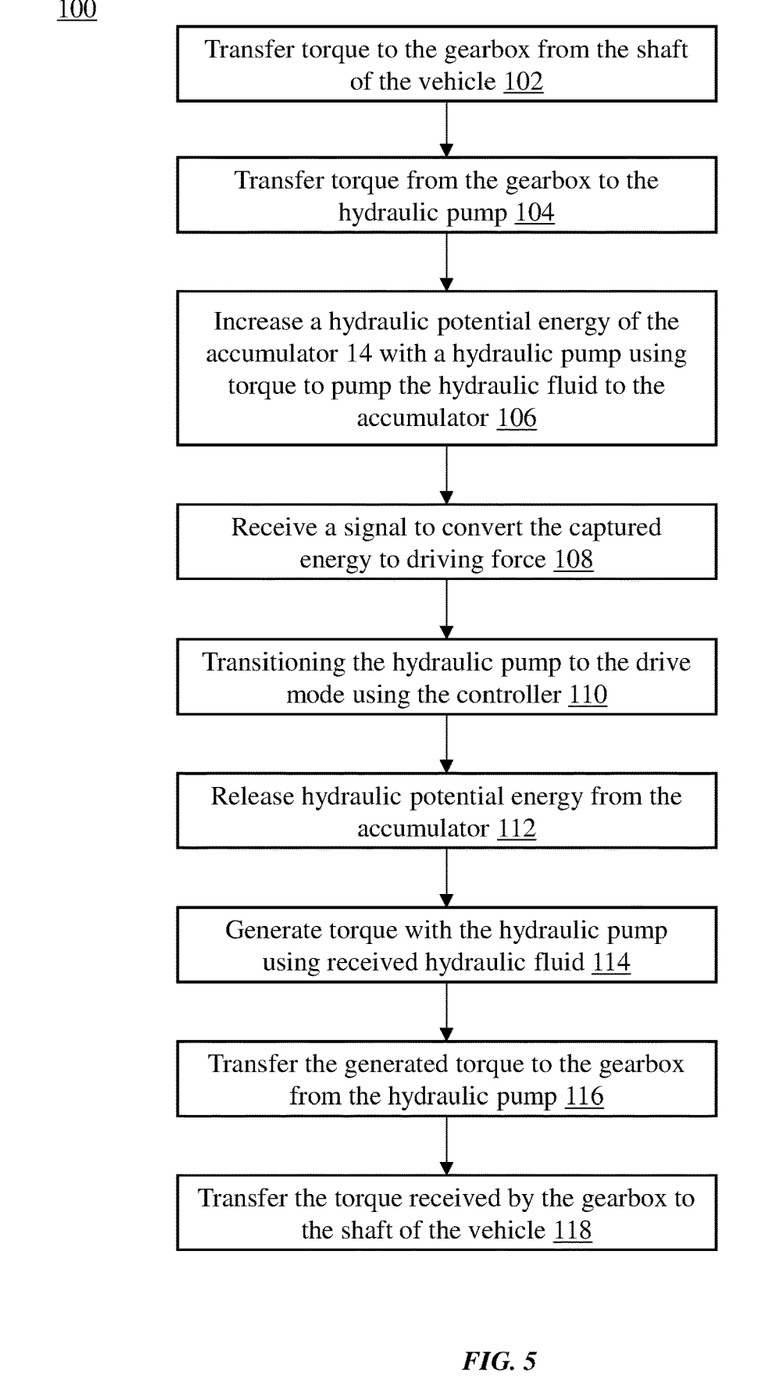
FIG. 5 is a flow diagram of an exemplary method for using a hydraulic regenerative braking system to capture energy from a vehicle during a braking event.

Turning to FIG. 5, a method 100 is shown for using a hydraulic regenerative braking system 10 to capture energy from a vehicle 22 during a braking event via a shaft 20 of the vehicle 22. During a braking event, energy is captured using a hydraulic fluid in steps 102, 104, and 106. In step 102, torque 24 is transferred to the gearbox 16 from the shaft 20 of the vehicle 22. In step 104, the torque is transferred from the gearbox 16 to the hydraulic pump 12. In step 106, the hydraulic pump 12 increases a hydraulic potential energy of the accumulator 14 by using the received torque 24 to pump the hydraulic fluid 18 to the accumulator 14.

In step 108, a signal is received to convert the captured energy to driving force to propel the vehicle. For example, the controller 13 may receive a signal from a driver of the vehicle 22 to accelerate the vehicle 22 (e.g., the signal may be generated by the driver pressing down on the accelerator). In step 110, the processor circuitry 17 of the controller 13 causes the hydraulic pump 12 to transition to the drive mode.

The captured energy is converted to driving force to propel the vehicle in steps 112, 114, 116, and 118. In step 112, the hydraulic potential energy is released from the accumulator 14, such that the hydraulic fluid 18 is received by the hydraulic pump 12 from the accumulator 14. In step 114, torque 24 is generated by the hydraulic pump 12 from the received hydraulic fluid 18. In step 116, the generated torque 24 is transferred to the gearbox 16 from the hydraulic pump 12. In step 118, the torque 24 received by the gearbox 16 is transferred to the shaft 20 of the vehicle 22.

The gearbox 16 may be coupled to the shaft 20 via a transmission (e.g., a throughput transmission). In some embodiments, the shaft 20 includes a first shaft section decoupled from a second shaft section. The transmission may be installed between the first shaft section and the second shaft section. The shaft 20 may also include one or more universal joints with gearing to transfer rotation of the first shaft section to the second shaft section.

The system 10 may additionally include a clutch for reducing torque load on the shaft 20 and/or the hydraulic pump 12. For example, when the shaft 20 is rotating (e.g., when an engine of the vehicle is rotating the shaft 20), the clutch may be disengaged. When a braking event begins (e.g., when a driver presses on a brake pedal), the clutch may be engaged, enabling the shaft 20 to transfer rotational energy to the hydraulic pump 12. Similarly, when the driver presses on an accelerator of the vehicle 22, the clutch may mechanically couple the hydraulic motor 12 to the shaft 20 via the gearbox 16, enabling the hydraulic pump 12 (e.g., via the hydraulic potential energy supplied by the accumulator 14) to drive the shaft 20by itself or in combination with an engine of the vehicle 20.

The controller 13 may receive a brake signal and a drive signal, as discussed above. The brake signal and the drive signal may include, but are not limited to foot pedals, levers, actuators, another control system providing electrical or mechanical input, etc. The brake signal and the drive signal are not necessarily of a common or similar type and may or may not be operated by a common operator.

The controller 13 may receive signals (also referred to as data) from one or more sensors. The sensors may be retrofit onto the engine, the shaft 20, the accumulator 14, the gearbox 16, or in any other suitable location for detecting operation of the system 10 and/or the vehicle 22. For instance, one or more of the sensors may indicate a position of a component, a change in position of the component, a rate of change of the component, etc.

The sensors may include sensors and instruments mounted to or otherwise monitoring the components in which the sensors are included. The controller 13 may adjust one or more settings and/or operational states in the components of the hydraulic regenerative braking system 10 based on data measured by the sensors. For example, the controller 13 may receive rotational data from a tachometer monitoring rotational speed of the shaft 20. A volume of an accumulator included in the accumulator 14 may be adjusted based on the received rotational data. Some other examples of the sensors may include pressure transducers, displacement sensors, system enable switches, position sensors, global positioning system (GPS) sensors/receivers, speed sensors, other similar sensors, or any combination thereof.

Additionally or alternatively, the sensors may include levers, switches, and actuators. The physical action of the levers, switches, and actuators may indicate an operating condition of the engine. For example, a limit switch may be mounted near the accelerator and/or brake pedal. When a user operates the accelerator and/or brake pedal, motion of the accelerator and/or brake pedal may physically interfere with the limit switch indicating a given position of the accelerator and/or brake pedal. The levers, switches, and actuators may be mechanical, hydraulic, electric, pneumatic, etc.

In some embodiments, the controller 13 may use a standard communication protocol. In these and other embodiments, signals communicated from the sensors and/or signals accessed via the CAN bus 136 may be formatted according to the standard communication protocol. For example, the controller 13 may use the J1939 bus protocol. Accordingly, in this and other embodiments, the sensors such as the position sensors and/or the speed sensors may generate J1939 messages.

For example, the controller 13 may include a primary throttle subroutine calibrated to the position of the accelerator pedal and hydraulic potential energy stored in the accumulator 14. The position of the accelerator pedal may be controlled and/or monitored via an analog signal or a J1939 CAN Bus signal or another communication protocol.

In the primary throttle subroutine, a throttle signal, which controls fuel management to the engine, may be adjusted to decrease an amount of fuel required to move the vehicle at a rate indicated by a position of the accelerator pedal from 100% to 0% based upon an amount of hydraulic potential energy stored in the accumulator 14. When there is enough hydraulic potential energy to propel the vehicle forward at a desired rate, the throttle signal communicated to the engine is delayed or reduced until the hydraulic potential energy is expended and/or the operator returns the accelerator pedal to a reduced position. When the hydraulic potential energy is expended or there is insufficient hydraulic potential energy to drive the vehicle, the throttle signal is returned to a value based solely on the position of the accelerator pedal. A potential benefit of the primary throttle subroutine may include a reduction in fuel consumption and maximize the use of the engine and hydraulic potential energy.

Additionally, the controller 13 may include one or more hybrid control programs. The hybrid control programs may be configured to automatically and/or manually adapt performance characteristics of the hydraulic regenerative braking system 10 according to the application parameter inputs. A first parameter input may adapt controls of the hydraulic regenerative braking system 10 according to positional signals received from a GPS sensor/receiver, data signals input from the CAN bus, other sensors, or some combination thereof. For example, in an embodiment in which the hydraulic regenerative braking system 10 includes a vehicle 22, the controller 13 may receive the positional signals and route information. The positional signals may be compared with fuel efficiency data logged along one or more specific routes. The controller 13 may determine stop densities of the specific routes, which may include how frequently the vehicle stops. The controller 13 may determine a first set of controls for routes having short start/stop densities (e.g., stop signs and/or traffic signals located within two or more blocks) and another set of controls for routes having long start/stop densities (e.g., freeways or highways). As an example, the first set of controls may be configured to capture most of the rotational energy in the accumulator 14 at each stop and discharge the potential hydraulic energy during each acceleration. The second set of controls may be configured to not capture the rotational energy in the accumulator 14, for instance. During use, the controller 13 determines a current route and/or whether the current route has short start/stop densities or long start/stop densities. The controller 13 then implements braking energy stored in the accumulator 14 as well as the discharge of hydraulic potential energy from the accumulator 14 during acceleration according to the sets of controls suitable for the current route and/or the start/stop density.

In this example, the controller 13 determines two sets of controls based on two start/stop densities. In other embodiments, the controller 13 may determine three or more sets of controls based on three or more start/stop densities. Moreover, a single route may include multiple start/stop densities. The controller 13 may accordingly determine multiple sets of controls for the single route and/or determine an average start/stop density of the single route.

Figure 6:
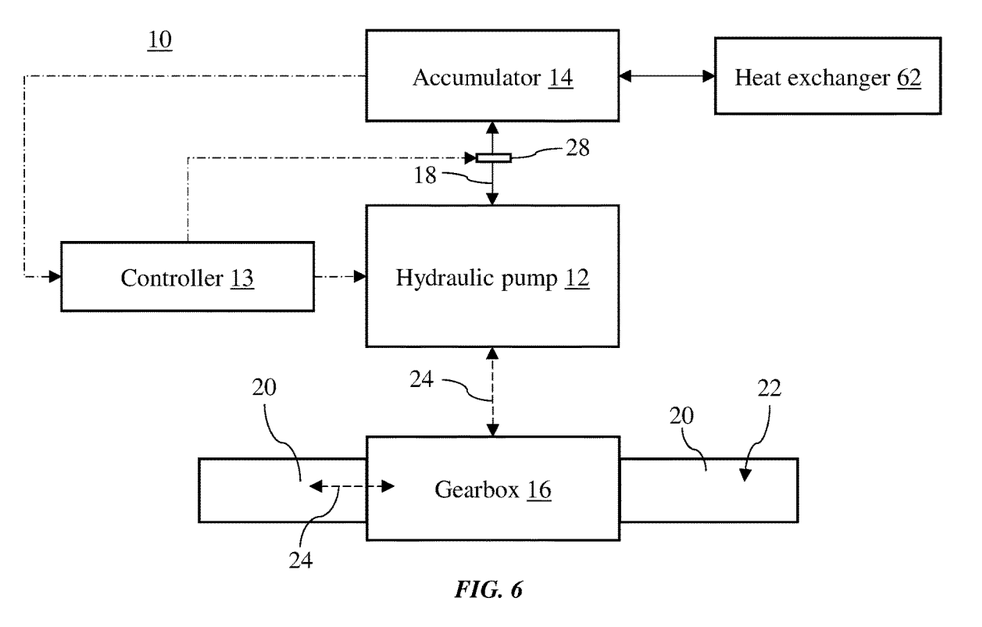
FIG. 6 illustrates a block diagram of a hydraulic braking system.

Turning to FIG. 6, a hydraulic braking system 60 is shown for supplementing foundational brakes of a vehicle 22 using hydraulic fluid 18. The system 60 includes a hydraulic pump 12, a controller 13, a heat exchanger 62, an accumulator 14, a gearbox 16, and a variable orifice valve 28. Unlike the hydraulic regenerative braking system 10 described above, the hydraulic braking system 60 does not transfer hydraulic potential energy from the accumulator 14 to a shaft 20 of the vehicle. Instead, the hydraulic braking system 60 removes the hydraulic potential energy from the accumulator 14 as thermal energy via the heat exchanger 62. That is, in the drive mode, the hydraulic potential energy of the accumulator 14 moves the stored hydraulic fluid 18 from the accumulator 14 to the heat exchanger 62. The heat exchanger 62 receives the hydraulic fluid 18 and removes thermal energy from the hydraulic fluid 18.

As described above, the variable orifice valve 28 of the hydraulic braking system 60 or the hydraulic regenerative braking system 10 regulates flow of the hydraulic fluid 18 from the hydraulic pump 12 to the accumulator 14. The controller 13 controls the variable orifice valve 28, such that a resistance to flow of the hydraulic fluid from the hydraulic pump is maintained during the braking event. That is, as resistance to flow occurs, a back pressure on the hydraulic pump 12 causes resistance on the shaft 20 via the gearbox 16. The back pressure may bring or assist in bringing the vehicle to a stop with or without assistance from the foundational vehicle braking system. For example, by maintaining a resistance to flow of the hydraulic fluid (e.g., within 10% or 20% of a predetermined flow resistance), braking (e.g., deceleration) may be uniform through the braking event.

By transferring rotational energy (also referred to as torque 24) from the shaft 20 (e.g., the drive shaft) of the vehicle 22, to the accumulator 14 as hydraulic potential energy, the vehicle 22 may be slowed down during braking without using the foundational brakes (e.g., standard brake pads of the vehicle 22). This allows for foundational brakes to be used less often, resulting in less maintenance and cost.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A hydraulic regenerative braking system for using hydraulic fluid to capture energy from a vehicle during a braking event via a shaft of the vehicle, the system comprising:
a hydraulic pump having a capture mode and a drive mode, wherein the hydraulic pump is configured to act as a pump in the capture mode and as a motor in the drive mode;
a controller including processor circuitry configured to cause the hydraulic pump to transition between the capture mode and the drive mode;
an accumulator configured to:
receive and store hydraulic fluid from the hydraulic pump, such that a hydraulic potential energy is increased in the accumulator in the capture mode during the braking event; and
release the stored hydraulic fluid to the hydraulic pump, such that the hydraulic potential energy is decreased in the accumulator in the drive mode; and
a gearbox mechanically linked to the shaft of the vehicle, such that:
in the drive mode, torque is transferred from the gearbox to the shaft of the vehicle; and
in the capture mode, torque is transferred to the gearbox from the shaft of the vehicle;
a variable orifice valve configured to regulate flow of the hydraulic fluid from the hydraulic pump to the accumulator;
wherein the controller is configured to control the variable orifice valve, such that a resistance to flow of the hydraulic fluid from the hydraulic pump is maintained during the braking event;
wherein the hydraulic pump is hydraulically connected to the accumulator and is mechanically connected to the gearbox, such that:
in the capture mode, the torque received by the hydraulic pump from the gearbox results in the hydraulic pump pumping the hydraulic fluid to the accumulator; and
in the drive mode, the hydraulic fluid received by the hydraulic pump from the accumulator results in the hydraulic pump supplying torque to the gearbox;
wherein, in the drive mode, the hydraulic potential energy of the accumulator moves the stored hydraulic fluid from the accumulator to the hydraulic pump, such that:
the hydraulic pump generates and supplies torque to the gearbox; and
the gearbox transfers the received torque to the shaft of the vehicle; and
wherein, in the capture mode, the torque is transferred to the gearbox from the shaft of the vehicle, such that the torque received by the gearbox is transferred to the hydraulic pump, causing the hydraulic pump to pump the hydraulic fluid to the accumulator, increasing the hydraulic potential energy of the accumulator;
wherein in the capture mode, both the hydraulic potential energy of the accumulator and the variable orifice valve affect the resistance to flow of the hydraulic fluid from the hydraulic pump to the accumulator, and
the controller is configured to control the variable orifice valve to compensate for an internal pressure of the accumulator; and
wherein the controller is configured to control the variable orifice valve, such that a resistance to rotation of the shaft of the vehicle is uniform during the braking event.

2. The system of claim 1, wherein:
the hydraulic pump includes a swashplate; and
a positioning of the swashplate controls whether the hydraulic pump operates in the capture mode or the drive mode by controlling a flow direction of the hydraulic fluid relative to the hydraulic pump.

3. The system of claim 1, wherein:
the hydraulic pump includes a rotating shaft;
the hydraulic fluid received by the hydraulic pump from the accumulator causes the rotating shaft to rotate; and
the rotating shaft is rotationally connected to the gear box, such that rotation of the rotating shaft causes rotation of the shaft of the vehicle.

4. The system of claim 1, wherein the hydraulic pump is a hydrostat.

5. The system of claim 1, wherein the controller is further configured to output an acceleration signal to an engine of the vehicle based on the hydraulic potential energy of the accumulator, such that a decrease in the hydraulic potential energy of the accumulator results in an increase in the acceleration signal.

6. The system of claim 1, further comprising an electric generator, wherein the electric generator is mechanically connected to the hydraulic pump and is configured to generate electricity from torque supplied by the hydraulic pump in the drive mode.

7. The system of claim 1, further comprising: an electric generator configured to generate electricity; and
an auxiliary hydraulic pump mechanically coupled to the electric generator, and hydraulically coupled to the accumulator, wherein the auxiliary hydraulic pump is configured to:
receive hydraulic fluid from the accumulator;
generate torque from the received hydraulic fluid; and
supply torque to the electric generator; such that the electric generator generates electricity.

8. The system of claim 1, wherein:
the hydraulic pump includes a first bent axis hydraulic pump and a second bent axis hydraulic pump;
the gearbox is a planetary gearbox having a clutch, a first gear ratio, a second gear ratio, and a third gear ratio;
the first bent axis hydraulic pump is rotationally connected to the first gear ratio;
the second bent axis hydraulic pump is rotationally connected to both the second gear ratio and the third gear ratio by the clutch; and
the system further comprises a control valve configured to control a direction of flow of the hydraulic fluid, such that the hydraulic fluid either flows to:
the accumulator from the first bent axis hydraulic pump and the second bent axis hydraulic pump; or
the first bent axis hydraulic pump and the second bent axis hydraulic pump from the accumulator.

9. The system of claim 1, further comprising an actuator and a repositionable gear, wherein:
the actuator is controllable by the controller to alter a position of the repositionable gear between an engaged position and a disengaged position;
in the engaged position, the repositionable gear interacts with the shaft, such that torque is transferred between the gearbox and the shaft; and
in the disengaged position, the repositionable gear does not interact with the shaft, such that torque is not transferred between the gearbox and the shaft.

10. A method for using a hydraulic regenerative braking system to capture energy from a vehicle during a braking event via a shaft of the vehicle, the method comprising:

during the braking event, capturing energy using a hydraulic fluid by:
    transferring torque to a gearbox of the system from the shaft of the vehicle, wherein the gearbox is mechanically linked to the shaft of the vehicle;
    transferring the torque from the gearbox to a hydraulic pump of the system, wherein the gearbox is mechanically linked to the hydraulic pump;
    the hydraulic pump increasing a hydraulic potential energy of an accumulator by using the received torque to pump the hydraulic fluid to the accumulator, wherein the hydraulic pump is configured to act as a pump in a capture mode and as a motor in a drive mode;
    maintaining a resistance to flow of the hydraulic fluid from the hydraulic pump by controlling a variable orifice valve, wherein the variable orifice valve is configured to regulate flow of the hydraulic fluid from the hydraulic pump to the accumulator;
    controlling the variable orifice valve using the controller to compensate for an internal pressure of the accumulator;
    wherein the variable orifice valve is controlled, such that a resistance to rotation of the shaft of the vehicle is uniform during the braking event;
    receiving a signal to convert the captured energy to driving force to propel the vehicle;
    transitioning the hydraulic pump to the drive mode using processor circuitry of a controller of the system; and
    converting the captured energy to the driving force to propel the vehicle by:
        releasing hydraulic potential energy from the accumulator, such that the hydraulic fluid is received by the hydraulic pump from the accumulator;
        generating torque by the hydraulic pump from the received hydraulic fluid;
        transferring the generated torque to the gearbox from the hydraulic pump; and
        transferring the torque received by the gearbox to the shaft of the vehicle.

11. The method of claim 10, wherein the switching between the capture mode and the drive mode is controlled by the controller causing a change in a position of a swashplate of the hydraulic pump.

12. The method of claim 10, further comprising outputting an acceleration signal to an engine of the vehicle based on the hydraulic potential energy of the accumulator, such that a decrease in the hydraulic potential energy of the accumulator results in an increase in the acceleration signal.

13. The method of claim 10, further comprising generating electricity using an electric generator by supplying torque to the electric generator from the hydraulic pump in the drive mode.

14. A hydraulic braking system for supplementing foundational brakes of a vehicle using hydraulic fluid, the system comprising: a hydraulic pump having a capture mode and a drive mode; a controller including processor circuitry configured to cause the hydraulic pump to transition between the capture mode and the drive mode; a heat exchanger configured to receive the hydraulic fluid and remove thermal energy from the hydraulic fluid; an accumulator configured to: receive and store the hydraulic fluid from the hydraulic pump, such that a hydraulic potential energy is increased in the accumulator in the capture mode during the braking event; and release the stored hydraulic fluid to the heat exchanger, such that the thermal energy is decreased in the hydraulic fluid in the drive mode; a gearbox mechanically linked to the shaft of the vehicle, such that in the capture mode, torque is transferred to the gearbox from the shaft of the vehicle, wherein: the hydraulic pump is hydraulically connected to the accumulator and is mechanically connected to the gearbox, such that in the capture mode, torque received by the hydraulic pump from the gearbox results in the hydraulic pump pumping the hydraulic fluid to the accumulator; and in the drive mode, the hydraulic potential energy of the accumulator moves the stored hydraulic fluid from the accumulator to the heat exchanger; and in the capture mode, the torque is transferred to the gearbox from the shaft of the vehicle, such that the torque received by the gearbox is transferred to the hydraulic pump, causing the hydraulic pump to pump the hydraulic fluid to the accumulator, increasing the hydraulic potential energy of the accumulator; and a variable orifice valve configured to regulate flow of the hydraulic fluid from the hydraulic pump to the accumulator, wherein the controller is further configured to control the variable orifice valve, such that a resistance to flow of the hydraulic fluid from the hydraulic pump is uniform during the braking event.

* * * * *